March 28, 1950 R. M. ULRICH 2,501,797
SHOVEL LOADER
Filed May 22, 1946 4 Sheets-Sheet 1
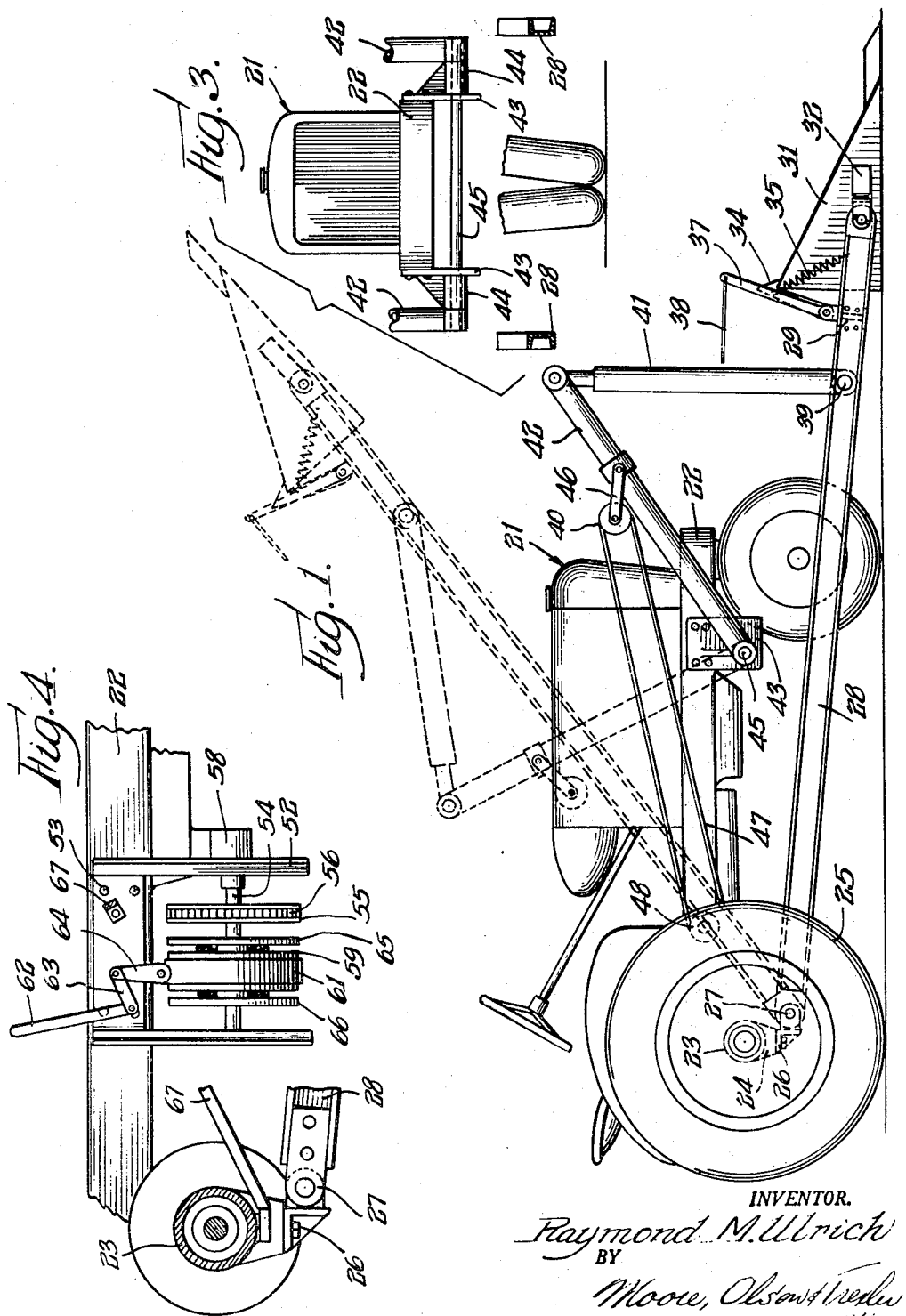
INVENTOR.
Raymond M. Ulrich
BY
Moore, Olson & Trexler
Attys March 28, 1950 R. M. ULRICH 2,501,797
SHOVEL LOADER
Filed May 22, 1946 4 Sheets-Sheet 2
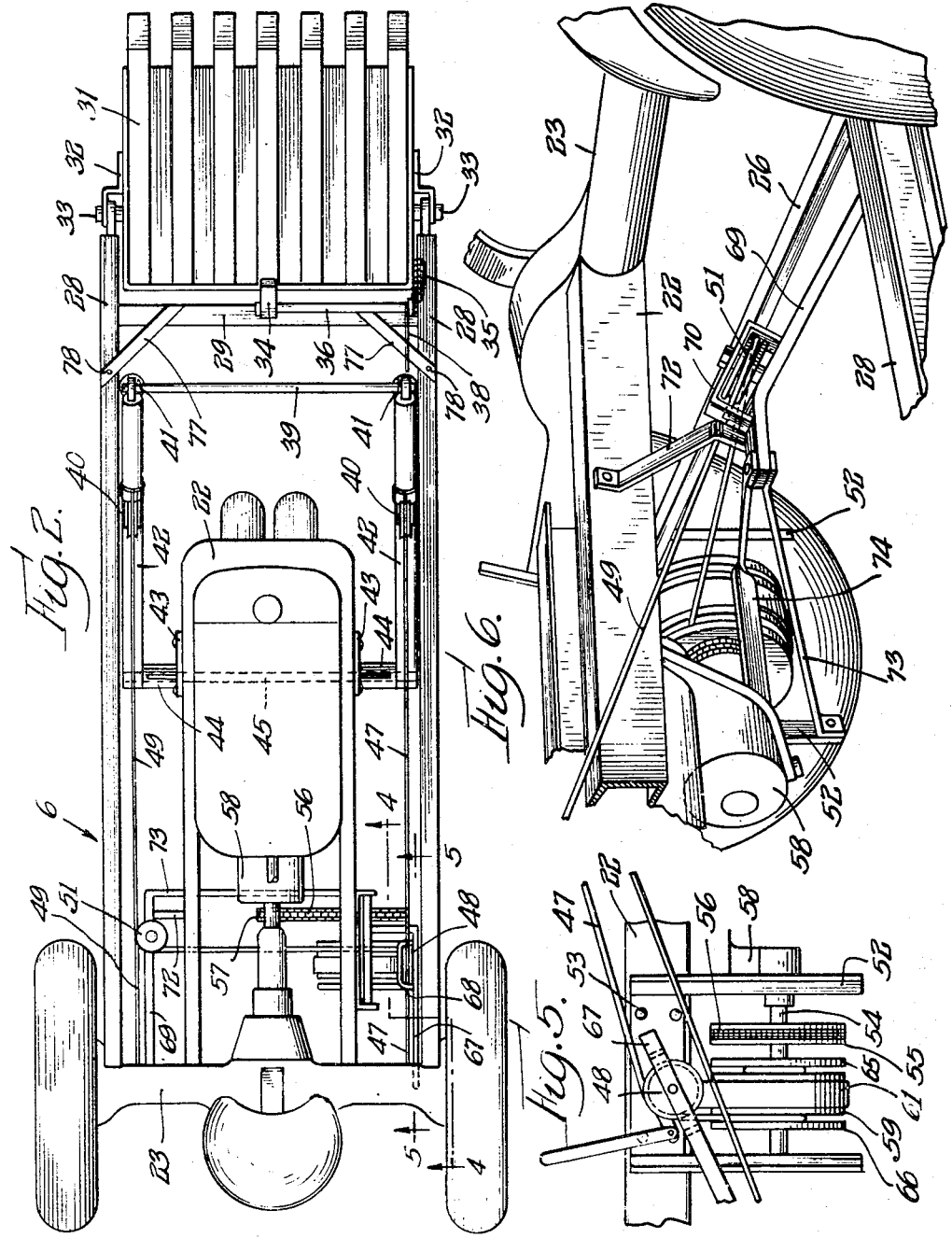
INVENTOR.
Raymond M. Ulrich
BY
Moore, Olson & Trexler
Attys.

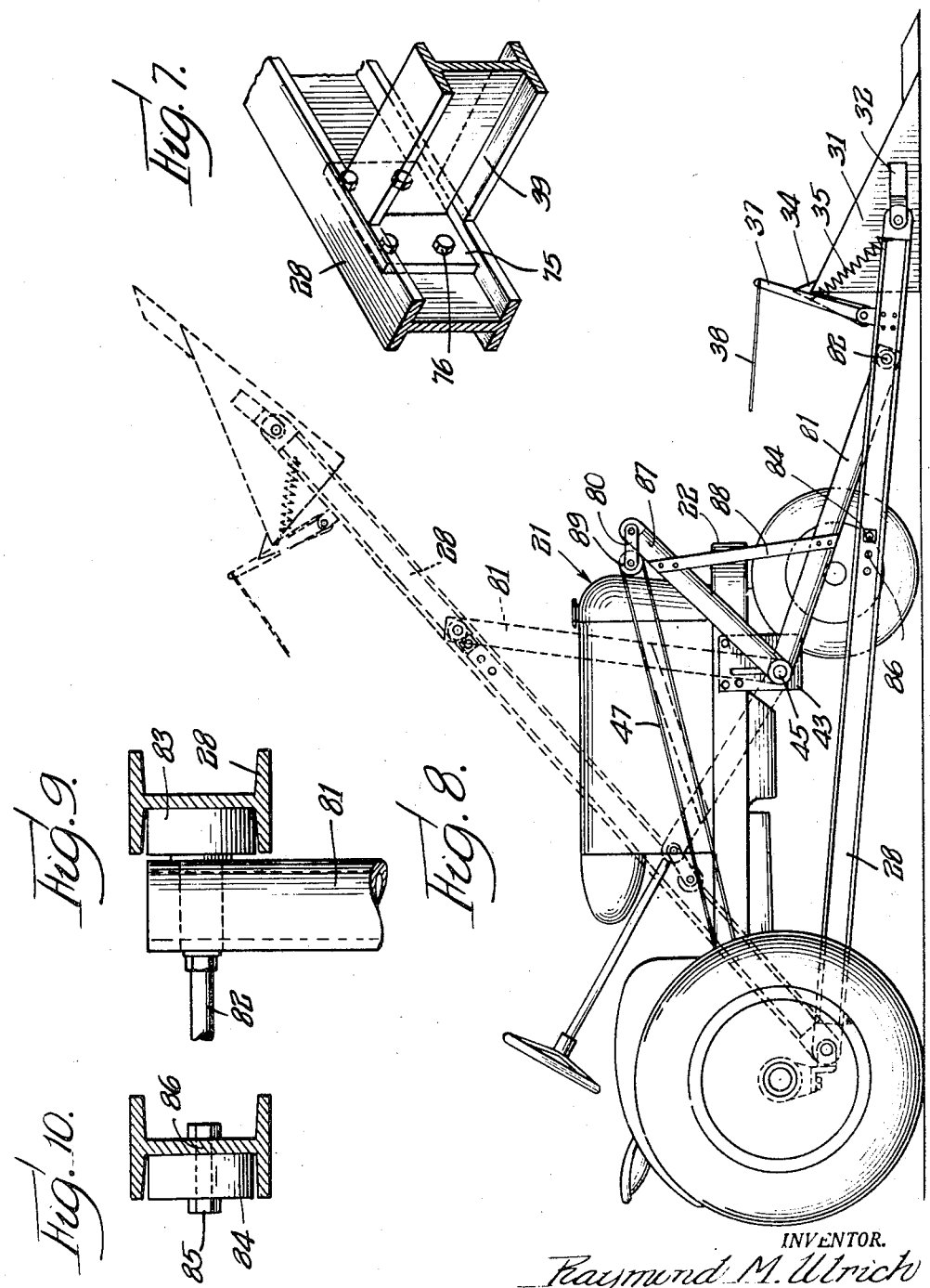

March 28, 1950 R. M. ULRICH 2,501,797
SHOVEL LOADER
Filed May 22, 1946 4 Sheets-Sheet 4
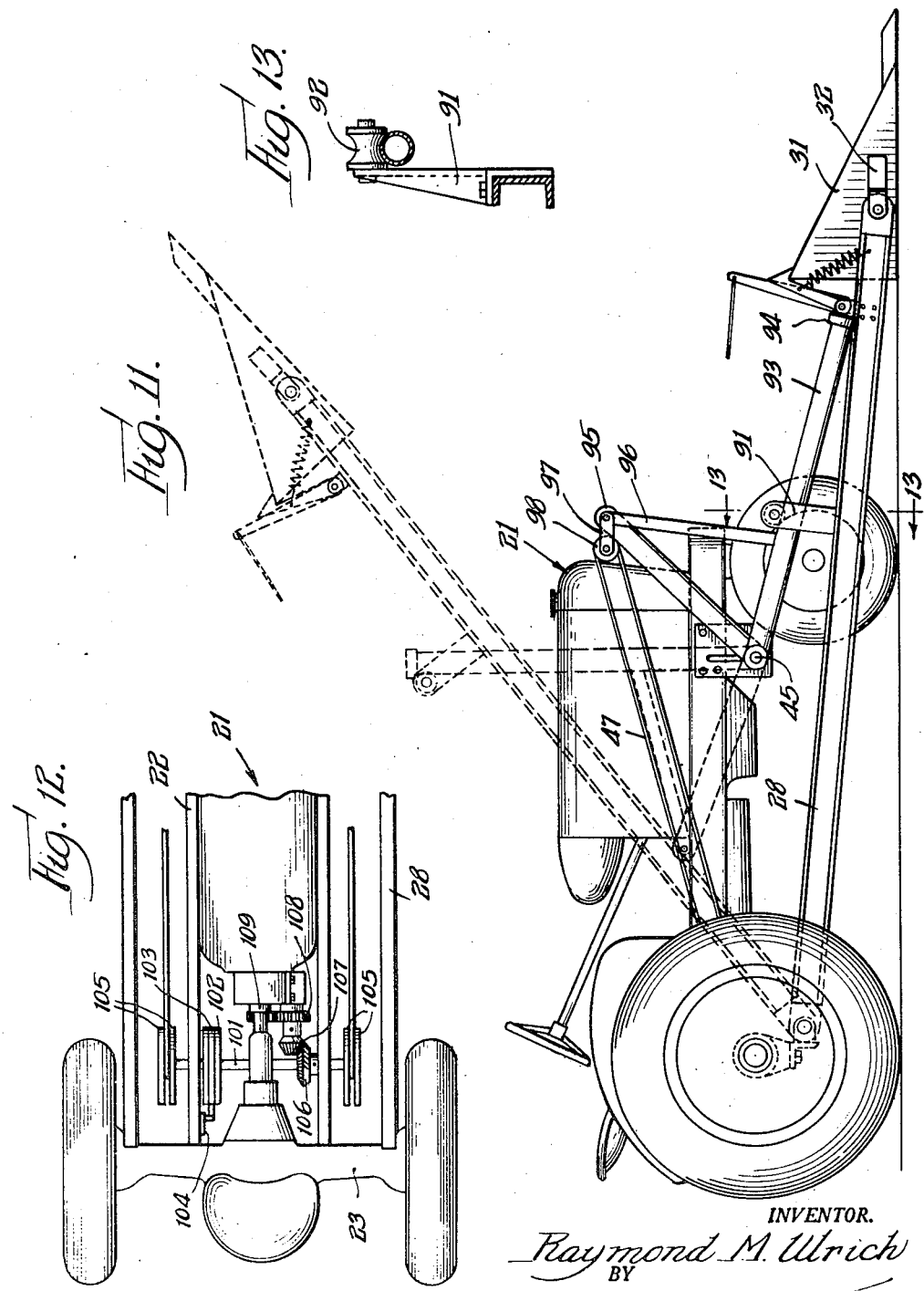
INVENTOR.
Raymond M. Ulrich
BY
Moore, Olson & Trexler
Attys.

Patented Mar. 28, 1950

2,501,797

UNITED STATES PATENT OFFICE 2,501,797

SHOVEL LOADER

Raymond M. Ulrich, Roanoke, Ill.

Application May 22, 1946, Serial No. 671,465

5 Claims. (Cl. 214—140)

The present invention relates to loaders and more particularly to a loader of the type arranged to be attached to a vehicle or tractor to be driven therefrom for raising and lowering loads.

Heretofore loaders have been provided particularly for attachment to farm tractors so that the owner of the tractor may have available a loading device which is frequently needed by the owner. Such loaders have employed a pair of lifting beams which have been raised and lowered by a mechanism supported at the front of the tractor. Generally such mechanism has included a frame extending an appreciable distance above the tractor together with suitable levers and pulleys. In such arrangements it has been found that the view ahead of the tractor has been considerably obstructed by the framework and that the framework furthermore has the disadvantage of preventing the storage of the tractor in a low shed. In some of the arrangements of the prior art, certain other disadvantages have also been encountered so that it is desirable to provide an improved loader or lift which is readily detachable from the tractor so that the tractor within a short time may be used for other purposes. It also is desirable to provide a simplified lift with a minimum number of parts which will, however, be rigid and not subject to easy distortion.

It therefore is an object of the present invention to provide an improved loader or lifting device suitable for attachment to vehicles such as tractors.

It is a further object of the present invention to provide an improved simplified lift or loading device having a minimum number of parts which may be economically manufactured for attachment to vehicles such as tractors.

Still another object of the present invention is to provide for a vehicle such as a tractor a lift or loader which is readily detachable therefrom.

A still further object of the present invention is to provide a loader with a minimum number of parts which is relatively rigid and not subject to distortion in use.

A still further object of the present invention is to provide an improved loader for tractors and the like which will permit the tractor to be stored in a relatively low shed.

A further object of the present invention is to provide a loader for a tractor which will have less weight at the front of the tractor so as to distribute the load more equally in accordance with the normal distribution of the load on the tractor wheels.

Other and further objects of the present invention subsequently will become apparent by reference to the following description taken in conjunction with the accompanying drawings wherein Figure 1 is a side view of a tractor equipped with a loader embodying the present invention;

Figure 2 is a plan view of the tractor and loader shown in Figure 1;

Figure 3 is a partial front view of the tractor of Figures 1 and 2 illustrating certain mounting details;

Figure 4 is a partial side view showing the winch mechanism employed with the loader of Figures 1 and 2 as seen in the direction of the arrows along the line 4—4 of Figure 2;

Figure 5 is a partial view illustrating further details of the winch mechanism shown in Figure 4 as seen in the direction of the arrows along the line 5—5 of Figure 2;

Figure 6 is a perspective view of the tractor and certain loader mechanism as seen in the direction of the arrow of Figure 2;

Figure 7 is a perspective detailed view of a portion of the frame construction of the loader;

Figure 8 is a side view of a tractor equipped with a loader of another embodiment in accordance with the present invention;

Figure 9 is a detail view illustrating the roller mechanism employed in the loader of Figure 8;

Figure 10 is another detail view showing an adjustable stop employed in conjunction with the roller of Figure 9 and the loader of Figure 8;

Figure 11 is a side view of a tractor equipped with another embodiment of the loader in accordance with the present invention;

Figure 12 is a partial plan view of another embodiment of the winch mechanism applicable to any of the previously illustrated embodiments of the loader; and Figure 13 is a cross sectional view of a portion of the loader shown in Figure 11 as seen in the direction along the lines 13—13.

Referring more particularly to Figures 1, 2 and 3 of the drawings, there is illustrated a tractor 21 having a frame 22 and a rear axle housing 23 having depending support members 24. Connected to the depending support members 24 which are located adjacent the inside of each of the tractor wheels 25 is a transversely arranged angle iron bar 26 having a pair of forwardly extending pivotal connection ears 27. Connected to the ears 27 are a pair of I-beam members 28 which adjacent their front end are connected together by a transversely arranged I-beam 29. Beyond the transversely arranged I-beam 29 there is located a pivotally mounted bucket or scoop 31. The scoop 31 is provided with a pair of pivot bracket supports 32 which are pivotally connected to the outer extremities of the I-beams 28 by any suitable means such as a fastening bolt 33. The bucket 31 is retained in the position shown in Figures 1 and 2 until released, by a latch 34 which is biased forwardly by a spring 35. The latch 34 engages the bucket 31 in any suitable manner as for example by engaging the upper rear edge thereof. The latch 34 is mounted on an actuating rod or shaft 36 arranged to be actuated by a lever 37 having its outer extremity connected to a cable or cord 38. The cable or cord 38 extends to a suitable point adjacent the controls for the tractor so that it may be manipulated by the operator of the tractor. When it is desired to drop the load in the bucket 31, the operator pulls on the cord or cable 38 thereby moving the latch 34 so that the bucket 31 becomes unbalanced due to the load therein and pivots so as to discharge the load.

Adjacent the front of the beams 28 there is located a transversely arranged shaft 39 which carries a pair of lever arms 41. The lever arms 41 are connected to corresponding lever arms 42 which in turn are connected to a suitable pivotal connection mounted on the forward portion of the tractor 21. Adjacent the forward portion of the tractor are mounted a pair of support plates 43 each having a shaft housing 44 for a transversely arranged shaft 45. The shaft 45 preferably is connected in a suitable manner to each of the levers 42. The levers 42 therefore may be rigidly connected to the shaft 45 by any suitable means such as keying the shaft to the lever members 42.

Each of the levers 42 is provided with a pulley 40 carried by suitable pulley support 46. On the right side of the tractor a cable 47 is arranged so that one end thereof is fastened to the rear axle housing 23 of the tractor. The cable 47 passes over the pulley 40 and over an idler pulley 48 subsequently to be described. On the left side of the tractor a cable 49 is also secured at one extremity to the axle housing 23. The cable passes over the corresponding pulley 40 and over an idler pulley 51 to a winch mechanism.

The cables 47 and 49 are connected to the winding drums of a winch mechanism illustrated in Figures 4 and 5. The winch mechanism is carried by a frame 52 suitably secured to the frame 22 by suitable fastening means such as bolts 53. The frame 52 carries a shaft 54 which has mounted thereon a sprocket wheel 55. The sprocket wheel 55 is connected by an endless chain 56 to a sprocket 57 mounted on the power take-off shaft extending outwardly from a transmission case 58.

The shaft 54 carries a drum 59 which is provided with a suitable brake band 61 which is arranged so as to be self-locking in one direction of rotation of the drum 59. In order to release the brake 61 a suitable operating handle 62 is provided together with an interconnecting linkage including the levers 63 and 64. By manipulating the handle 62, the brake band 61 may be released any desired amount so as to permit rotation of the brake drum 51 which is mounted on the shaft 54. Mounted on opposite sides of the drum 59 are plates 65 and 66. The plates 65 and 66 are located a distance away from the outer surfaces of the drum 59 equal to the diameter of the cables 47 and 49 so that the cables are wound upon the shaft 54 in a spiral fashion. This arrangement of winding the cables on the winch provides for a greater speed of raising the load as the load approaches its upper limit of movement. The maximum power is applied to the cables at the time that the load is initially being lifted as is obviously desirable where the loader is used to scoop up material. In scooping up dirt, hay, straw, manure and the like, considerable power is required at the time that the scoop breaks away from the remainder of the pile of material. By the present arrangement, this advantageous application of force is readily obtained.

A brace 67 interconnects the upper portion of the frame 52 with the rear axle housing 23. In Figure 4 the brace 67 has been broken away for purposes of clarity. In Figures 2 and 5 the bracket 67 will be seen to extend in a direction closely adjacent to and parallel to one of the I-beam members 28. The bracket 67 is provided with a support bracket 68 which carries together with the member 67 the pulley 48.

On the other side of the tractor as may be seen from Figure 6 the pulley 51 is mounted on a bent bar or bracket 69 having its lower extremity secured to a transverse angle iron support 26. A U-shaped bracket 70 mounted on the brace 69 serves to retain in position the pulley 51. The upper extremity of the brace 69 is connected by a strap bracket member 72 to the frame 22 of the tractor. Another reinforcing bar 73 interconnects the upper extremity of the bar 69 with one of the depending bar members of the frame 52. Another twisted bar 74 interconnects the upper extremity of the bracket 69 with a point on the transmission case 58.

The transmission 58 in accordance with common practice in tractor construction is provided with a suitable transmission gear handle for shifting into and out of engagement the power take-off shaft which is provided with the sprocket 57. By applying power from the take-off shaft through the sprocket 57 to the winch, the loader may be raised from the full line position shown in Figure 1 to the dotted line position. As is customary, a suitable safety clutch or gear disengaging device may be employed which is to be actuated whenever the loader reaches its maximum elevation as generally illustrated by the dotted lines of Figure 1. The details of such devices, however, are well-known in the art and do not constitute a part of the present invention. When the maximum height of the load has been reached, power is disengaged from the winch mechanism and the self-acting brake 61 immediately locks the brake drum 52 against rotation in a reverse direction. The operator of the tractor thereupon throws the tractor into gear so as to move the tractor to a new location where the load picked up by the shovel or scoop 31 is to be dumped. When the new location has been reached, the tractor is stopped and the rope 38 is pulled. This releases the latch 34 so as to permit the shovel or scoop 31 to tilt and discharge its load. Thereafter the tractor may be returned toward its former position and the loader lowered. This lowering operation is brought about by actuation of the lever 62 which releases the brake band 61 to permit the cables to unwind from the winch. It is believed significant to note that when the loader is in the upper position generally indicated by the dotted lines of Figure 1, that the interconnecting levers 41 and 42 support a substantial portion of the load on the I-beams 28 and that the center of mass of the loader mechanism and the load carried thereby has been moved a great deal closer to the center of mass of the tractor per se.

The arrangement shown and thus far described, particularly when in the position of Figure 1, does not have any loader elements extending appreciably above the top of the tractor 21. The tractor with the loader lowered to approximately the position of the full lines may therefore be stored in a relatively low shed. In the lowered position of the loader, no elements of the loader obstruct the view of the tractor operator. If the loader should happen to engage a load to a greater extent on one side than another, the balancing shaft 45 which interconnects similar lever arms 42 will insure an equal lifting action on both of the beams 28 thereby to minimize and prevent the possibility of twisting or distortion of the frame. To further reinforce the beams 28 to withstand such action, the cross beam 39 is bolted to the beam 28 in a manner illustrated in detail in Figure 7. Each end of the cross I-beam 39 is welded to an attachment plate or bracket 75 which is secured in position by suitable bolts 76. The bolt construction of the I-beam 39 is provided so as to facilitate compact shipping. The I-beam as may be seen from Figure 2 is provided with two equally arranged reinforcing strap members 77 which are bolted to the longitudinally extending I-beams 28 by suitable bolts 78. This insures a rigid front end construction for the loader frame comprising the I-beams 28 and 29.

If it is desired to remove the loader from the tractor, the I-beams 28 are disconnected adjacent the axle support 26. The levers 42 are disconnected from the transversely arranged shaft 45. The pulleys 40 are disconnected from the levers 42 and may be secured to the frame of the tractor 22 so as not to necessitate removal of the cables 47 and 49. When these separations have been completed, the tractor may be backed away from the loader and used for other purposes. To reinstall a disconnected loader requires but a short time appreciably less than half an hour. From this it will be seen that there has been provided a loader which is readily detached from the tractor so that the tractor may be used for other purposes.

A further embodiment of the present invention is illustrated in Figures 8, 9 and 10 wherein those parts corresponding to the parts shown in the previous figures of the drawings have been given corresponding reference characters. In this arrangement, the I-beams 28 are raised and lowered by a pair of lever members 81 which are keyed to the transverse shaft 45. Each of the extremities of the lever members 81 are interconnected by a transverse shaft 82 which rigidly interconnects these members. On the inside of the I-beam 28 there is located a roller 83 which is carried by the outer extremity of each lever member 81. The roller 83 travels along the panel of the I-beam 28 until it reaches a stop member 84 shown in detail in Figure 10. The stop member 84 is secured in the desired adjusted position by a bolt 85. The bolt 85 passes through one of a plurality of apertures 86 located at spaced intervals along the I-beam 28. The purpose of a plurality of holes 36 is to provide proper location of the stopping block 84 dependent upon different tractors to which the loader may be applied.

The beam 81 is connected to another beam 76 by an interconnecting strap or beam 88. The upper extremity of the beam 87 is provided with a bracket 80 which carries a pulley 89. The pulleys 89 are engaged by the cables 47 and 49. When the cables 47 and 49 are wound up by a winch mechanism such as illustrated in the preceding figures, the beams 28 may be raised to substantially the position shown by the dotted lines in Figure 8. From the dotted line position, it will be noted that the beams 81 are very nearly in vertical positions thereby directly supporting from the shaft 45 and the bushings 44 therefor a substantial portion of the load comprising the weight of the loader and the material in a scoop or shovel 31. Thus again there has been provided a relatively simple arrangement which avoids excessive weight and load upon the front end of the tractor 21. The arrangement shown in Figure 8 likewise is readily and easily detached from the tractor 21 in a manner similar to the operation described in connection with the embodiment shown in previous figures.

Still another manner of employing the present invention is illustrated by Figures 11 and 13 where again similar reference characters have been employed of correspondingly similar components. In the arrangement shown in Figures 11 and 13, the I-beams 28 are provided with substantially normal roller circuit members 91 each provided with a roller 92. The rollers 92 are engaged by a pair of tubular lever members 93 having adjacent their outer extremities stop collars 94. The levers 93 are supported upon the cross shaft 45 and are connected to crank arms 95 by interconnecting lever straps 96. The outer extremities of the crank arms 95 are provided with pulley brackets 97 each carrying a pulley 98 for engaging respectively the cables 47 and 49. When the loader of this type of construction is moved toward its upper position, the stop collar 94 engages the roller 92 thereby to limit the upward movement of the loader. In such position the members 93 again assume the substantially vertical position thereby supporting on the equalizer rod or bar 45 a substantial portion of the load comprising the weight of the beams 28 and the material in the scoop or shovel 31.

In certain tractors the power take-off shafts are located to the rear of the main axle housing 23. In order to provide an arrangement suitable for application to such tractors and also to the type of tractor previously illustrated, a winch such as illustrated in Figure 12 may be employed. In the arrangement shown in Figure 12 a transversely arranged shaft 101 is provided with a brake drum 102 having thereon a brake 103 arranged to be released by a suitable lever 104. Adjacent the outer extremities of the shaft 101 there are provided winding drums each formed by a pair of circular plates 105 spaced apart a distance equal to the diameter of the cables to be wound thereon. On an intermediate point on the shaft 101 a bevel gear 106 is mounted for engagement with a bevel gear 107. The bevel gear 107 is mounted on a shaft carrying a gear 108 which is arranged to mesh with another gear 109 which is mounted on the power take-off shaft of the tractor.

From the arrangement illustrated in Figure 12, it will readily be appreciated by those skilled in the art that the winch mechanism may be located at various points along the longitudinal dimension of the tractor either ahead of or behind the axle housing 23. Thus the winch arrangement shown may readily be applied to various different types of power take-offs as found on various makes and models of tractors.

While for the purpose of illustrating and describing the present invention, a certain type of tractor has been shown, and the invention has further been shown as being applied to a tractor, it is to be understood that the invention is susceptible of application to different types and models of tractors and to other vehicles including jeeps. Since several embodiments have been illustrated, it will further be apparent to those skilled in the art that certain other variations and embodiments are contemplated and that such variations in the instrumentalities employed and in their location and arrangement may be made without departing from the spirit and scope of the invention set forth in the following claims.

I claim:

1. The combination comprising a tractor having a power take-off, and a loader comprising a pair of beams pivotally connected adjacent to the rear of the tractor, a cross beam interconnecting said pair of beams adjacent their outer extremities, a load engaging device mounted at the outer extremities of said pair of beams, a support bar mounted adjacent the front of the tractor beneath the frame thereof so as to extend beyond said frame, a lever mechanism mounted on said support bar and connected to said beams adjacent the outer extremities, a winch connected to the tractor power take-off, and a cable interconnecting said winch with said lever mechanism, said winch comprising a brake drum mounted on a shaft and a pair of plates mounted on said shaft in spaced relation to the sides of said drum to provide space for spirally winding cable therebetween on said shaft.

2. The combination comprising a tractor having a power take-off, and a loader comprising a pair of beams pivotally connected to the rear axle of the tractor, a scoop mounted on the outer extremities of said beams, a lever mechanism interconnecting an intermediate point on said beams with a forward point on said tractor, a winch connected to said power take-off, and a cable interconnecting said winch with said lever mechanism for raising and lowering said beams, said winch comprising a brake drum mounted on a shaft, a pair of plates mounted on said shaft in spaced relation to the sides of said drum to provide space for spirally winding cable therebetween on said shaft, and a self-locking brake band mechanism for said drum having manually operable release means.

3. The combination for a tractor having a power take-off shaft on the transmission case comprising a pair of beams adapted to be connected adjacent the rear tractor axle, a cross beam interconnecting said beams adjacent their outer extremities, said cross-beam being bolted to said beams and having angularly disposed braces fixedly secured to said cross-beam and bolted to said pair of beams, a shaft adapted to be mounted under the tractor frame adjacent its front end in back of the front wheels, lever mechanisms including two sets of pivoted arms interconnecting said shaft with said pair of beams in the proximity of said cross beam, a winch adapted to be connected to said power take-off, and a plurality of cables interconnecting said winch with said sets of pivoted arms.

4. The combination for a tractor having a power take-off comprising a pair of beams adapted to be pivotally connected adjacent the rear tractor axle, a cross shaft adapted to be mounted under the tractor frame adjacent its front end so as to extend beyond the frame, lever mechanisms including two sets of pivoted arms interconnecting the extremities of said shaft with said pair of beams in the proximity of the outer ends, a winch adapted to be connected to said power take-off, and a plurality of cables interconnecting said winch with said sets of pivoted arms, said winch comprising a brake drum mounted on a shaft and a pair of plates mounted on said shaft in spaced relation to the sides of said drum to provide space for spirally winding cable therebetween on said shaft.

5. The combination for a tractor having a power take-off comprising a pair of beams adapted to be pivotally connected adjacent the rear tractor axle, a cross shaft adapted to be mounted under the tractor frame adjacent its front end so as to extend beyond the frame, lever mechanisms including two sets of pivoted arms interconnecting the extremities of said shaft with said pair of beams in the proximity of the outer ends, a winch adapted to be connected to said power take-off, and a plurality of cables interconnecting said winch with said sets of pivoted arms, said winch comprising a brake drum mounted on a shaft and a pair of plates mounted on said shaft in spaced relation to the sides of said drum to provide space for spirally winding cable therebetween on said shaft, and a self-locking brake band mechanism for said drum having manually operable release means.

RAYMOND M. ULRICH.

REFERENCES CITED

The following references are of record in the file of this patent:

UNITED STATES PATENTS

| Number | Name | Date |
|---|---|---|
| 1,477,136 | Laurie | Dec. 11, 1923 |
| 1,687,841 | Manierre | Oct. 16, 1928 |
| 2,239,288 | Garner | Apr. 22, 1941 |
| 2,371,273 | Walker | Mar. 13, 1945 |
| 2,404,820 | Wuertz et al. | July 30, 1946 |
| 2,415,892 | Koehl et al. | Feb. 18, 1947 |
| 2,427,971 | McNeill, Jr. | Sept. 23, 1947 |
| 2,435,098 | Pokorny | Jan. 27, 1948 |